Aug. 14, 1956  R. J. CLEMENTS  2,759,167
SEISMIC DETECTOR
Filed Dec. 2, 1953
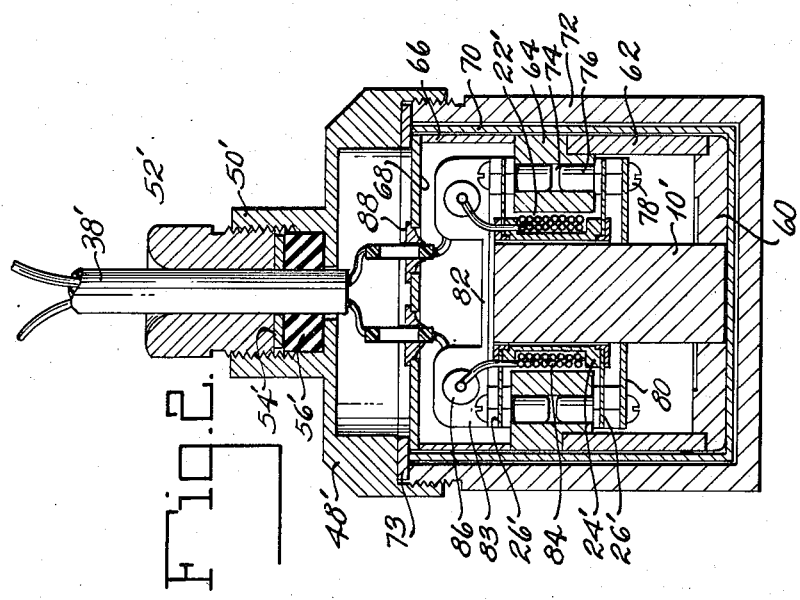
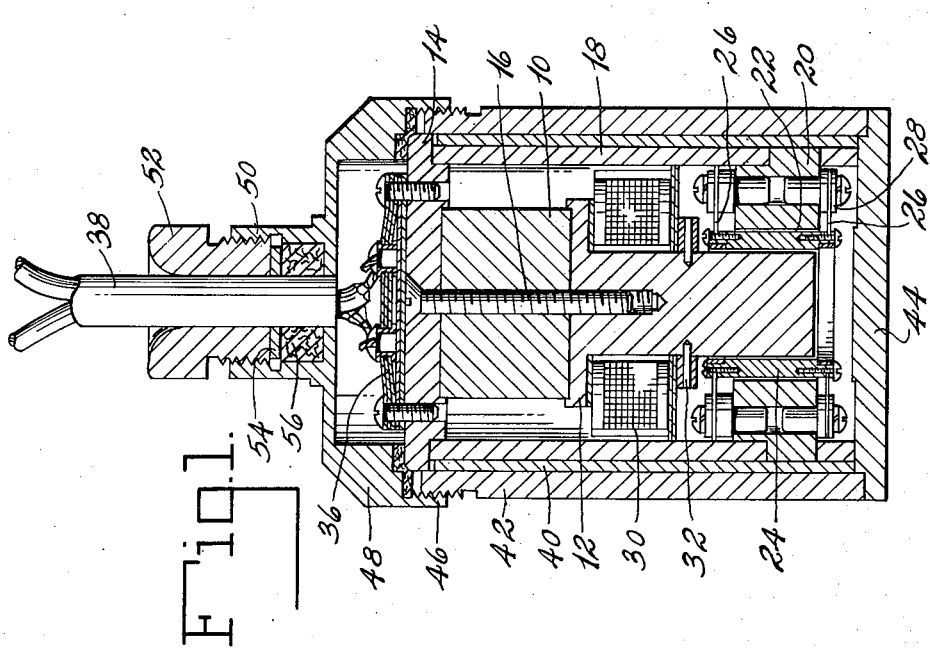

United States Patent Office 2,759,167
Patented Aug. 14, 1956

2,759,167

SEISMIC DETECTOR

Roy J. Clements, Bellaire, Tex., assignor to The Texas Company, New York, N. Y., a corporation of Delaware Application December 2, 1953, Serial No. 395,731

10 Claims. (Cl. 340—17)

This invention relates to seismic vibration detectors and more particularly to an instrument of this type which is both simple and rugged and substantially insensitive to the effect of external alternating magnetic fields.

This application is a continuation-in-part of my co-pending application Serial No. 349,496, filed April 17, 1953, entitled Seismic Detector, now abandoned.

In the United States Letters Patent No. 2,130,213, granted September 13, 1938, to Alexander Wolf, L. G. Cowles, and W. S. Richardson, a seismic vibration detector is disclosed in which electrical damping is used, this having the advantage of simplicity and independence of temperature for all practical purposes. In accordance with the disclosure in that patent, the electrical damping is provided by replacing the pick-up coil ordinarily suspended in the air gap of the magnet by a solid ring of non-magnetic metal and the pick-up coil winding is mounted on one of the pole pieces of the magnet. When the device is vibrated, an E. M. F. induced in the solid ring produces variations in the flux of the magnetic field and hence an E. M. F. in the pick-up coil. As disclosed in the patent, the inertia member of the detector comprises a solid cylinder of a non-magnetic material such as aluminum or copper, which cylinder substantially fills the space in the air gap of the magnetic circuit. The cylinder is, of course, resiliently supported to provide relative movement with respect to the magnetic circuit when the device is vibrated by earth tremors or the like.

Since, in seismic exploration, the motions of the earth which must be observed are very small, frequently one millionth part of an inch or less, the voltages and currents developed by the detectors are likewise very small. When it is attempted to make observations in the vicinity of electric power lines, it is frequently found that the alternating magnetic field surrounding the power line induces a much higher voltage in the detector than the voltages produced by the earth motion. Under these conditions it is obviously impossible to observe the latter. The seismic detector of the present invention is in some respects similar to the detector disclosed in the above-mentioned U. S. Letters Patent No. 2,130,213, but in accordance with the invention, the magnet used in the detector is of an entirely different shape and is arranged so that a substantial magnetic shield can be placed around the instrument to shield the instrument from external alternating currents and without in any manner weakening the flux of the magnetic circuit.

In the above-mentioned U. S. Patent No. 2,130,213, the magnet is in the form of a hollow cylinder having a central axially disposed pole piece in parallel thereto. Attempts have been made to magnetically shield detectors of this type but it was found that when a soft iron case or shield member was placed around the cylindrical magnet, a large portion of the flux passed through the shield and thus by-passed the magnetic circuit.

In carrying out the present invention in one form a detector is provided in which the magnet is in the shape of a short rod having upper and lower poles. A soft iron magnetic circuit substantially encloses the magnet and an air gap is formed in this circuit, in which air gap the inertia member or cylinder is resiliently suspended. The pick-up coil surrounds a pole piece disposed axially of the magnet and within the magnetic circuit to shield, at least in part, the coil from externally created magnetic waves and is sensitive to any variations in the flux produced by relative movements between the inertia member and the rest of the magnetic circuit. A cylinder of non-magnetic material such as copper surrounds the magnetic circuit of the detector. Surrounding this copper cylinder is another cylindrical member of soft iron closed by a soft iron disc or plate at one end and by a soft iron cover member at the other. The soft iron cylinder, disc and cover member thus form the outer casing or housing for the device and provide additional magnetic shielding for the pick-up coil whereas the copper cylinder provides an electrostatic shield and means for substantially insulating the soft iron casing from the magnetic circuit.

In a slightly modified form of the invention, a seismic detector is provided which embodies the general principles of the detector described above but which is somewhat more simple in construction, more rugged and of lighter weight. In this modified form, the pick-up coil is wound directly upon a copper inductor which is disposed within the air gap and which also serves as a damping means.

For a better understanding of the invention, reference may be had to the accompanying drawing in which Fig. 1 is a vertical sectional elevation through a vibration detector embodying the invention, and Fig. 2 is a similar view of a slightly modified form of detector.

Referring to Fig. 1 of the drawing, a magnet 10 is shown as provided with an elongated pole piece 12 extending axially from one of the poles of the magnet. At the upper end of the magnet and in contact with the other pole thereof is a soft iron disc 14. The magnet 10, pole piece 12 and disc 14 are secured together by means of the centrally disposed bolt 16. Shown as extending from the outer edge of the disc 14 is a soft iron cylinder 18 and around the inner lower end of this cylinder is an annular soft iron pole piece 20. The pole piece 20 extends inwardly toward the other pole piece 12 and an air gap 22 is provided between the opposed surfaces of the two pole pieces. An inertia member 24 in the form of a cylindrical, non-magnetic member of copper or the like fills most of the space within the air gap 22 and this inertia member is resiliently supported by means of wafer-like springs 26. The springs 26 are connected to the upper and lower ends of the cylindrical inertia member 24 and also to suitable supports 28 attached rigidly to the annular pole piece 20. A pick-up coil 30 encircles the pole piece 12 at the portion closest to the magnet 10 and is held in place by means of the pins 32 extending outwardly from the pole piece. Electrical connections, not shown, extend from the coil 30 to binding posts 34 mounted in a fiber insulating member 36 directly above the disc 14. An insulated cable 38 is connected to the binding posts 34 and conducts the output from the coil 30 to suitable amplifying and recording devices not shown.

Considering the elements thus far described, it will be observed that a vibration, producing relative movement between the inertia member 24 and the rest of the apparatus will cause a change in the flux through the magnetic circuit comprising the magnet 10, upper plate 14, cylinder 18 and the pole pieces 20 and 12, and this change in flux will produce a measurable variation in the current through the coil winding 30.

A cylinder 40 of non-magnetic material such as copper surrounds the soft iron cylinder 18 and the inertia member 24 and provides an electrostatic shield for the coil 30. Surrounding the cylinder 40 is another cylinder 42 of greater thickness and of soft iron, this cylinder being connected at its lower periphery to a soft iron plate 44 and at its upper end by a threaded connection 46 to a soft iron cover member 48. At the top of the cover member 48 is cylindrical extension 50 into which is threaded a plug of brass or the like indicated at 52, this plug 52 having a central opening to accommodate the cable 38. By screwing the plug 52 into the member 50 against a plate 54, a packing 56 of rubber or the like will be compressed around the cable 38 to form an effective seal. As can be readily seen in the drawing, the copper cylinder 40 in addition to functioning as an electrostatic shield acts as a magnetic insulating member between the soft iron cylinder 18 of the magnetic circuit and the outer soft iron cylinder 42.

The cylinder 42, bottom plate 44 and cover plate 48 form an effective magnetic shield for the coil 30 and prevent any external alternating current field from affecting the output of the coil. The elements 42, 44, and 48 also serve as the casing or housing for the detecting instrument.

It will be observed that a compact and efficient vibration detector utilizing electrical damping of the inertia element has been provided and which is substantially completely shielded from any alternating magnetic fields which exist in the vicinity of electric power lines and the like.

In the modified form of the invention shown in Fig. 2, the magnet 10' is also in the shape of a short rod and projects upwardly from a soft iron disc or plate 60 attached in turn around its upper periphery to an iron cylinder 62. An annular iron pole piece 64 is attached to the upper edge of the cylinder 62 and projects radially inwardly toward the magnet 10' and air gap 22'. The disc 60, cylinder 62, pole piece 64 and air gap 22' comprises the magnetic circuit for the magnet 10'. A short cylindrical member 66 of brass or the like is disposed between the periphery of the pole piece 64 and a brass plate 68. The assembly so far described is disposed within a cup 70 of non-magnetic material such as copper which corresponds to the cylinder 40 of Fig. 1 and which provides electrostatic shielding for the detector. The copper member 70 is disposed in turn within an iron case 72, also cup-shaped, and provided around its upper edge with threads adapted to be engaged by similar threads on an iron cover 48'. A rubber gasket 73 is disposed between the cover 48' and the upper edge of the cup members 70 and 72. As is the case with the detector of Fig. 1, the cover 48' is provided with a cylindrical extension 50' into which is threaded a plug 52' of brass or the like, this plug having a central opening to accommodate the cable 38'. A small disc 54' is disposed between the inner end of the plug 52' and a packing 56' of rubber or the like in such a manner that the packing will be compressed around the cable 38' to form an effective seal.

The pole piece 64 is provided with a plurality of holes 74 into which plug members 76 are pressed so as to provide supports for screws 78, which in turn support a lower rigid disc 80 and an upper rigid disc member 82 having a pair of upwardly projecting ears 83. Also supported by the screws 78 is a pair of annular spring members 26' which serve to support the inductor ring 24' corresponding to the ring 24 of Fig. 1. The ring 24', however, is shaped in the form of a spool or bobbin and supports the pick-up coil 84 which is wound around the hollow portion of the ring, as shown in the drawing. The inductor ring 24' and the coil 84 thus comprise the inertia element of the detector. Connecting leads from the ends of the coil 84 pass through insulators 86 in the member 82 and from there through insulating discs 88 disposed in holes in the brass disc 68. As shown, the conductors of the cable 38' are connected to the pick-up coil leads projecting through the insulators 88.

The operation of the detector shown in Fig. 2 is very similar to that of the detector previously described and shown in Fig. 1. A vibration, producing relative movement between the inertia member 24' and the rest of the apparatus will cause the coil 84 to cut the magnetic flux in the air gap 22' and an electrical current will thereby be generated in the coil proportional to the magnitude of the vibration. The cable 38' will, of course, be connected to suitable amplifying and recording equipment not shown.

It will be observed that in the modified form shown in Fig. 2, the size and weight of the detector has been reduced but nevertheless, it has been found that the sensitivity of the detector has not been impaired. Good electrical damping of the vibrations of the inertia element is obtained due to the presence of the one piece copper ring 24' suspended within the air gap 22' and the size and weight of the instrument has been lowered by winding the pick-up coil 84 on the inductor ring 24'. Naturally, when disposed directly within the air gap, the pick-up coil can be considerably smaller than when it is disposed in fixed relation around the magnet as in the form illustrated in Fig. 1. Experiments have shown that whereas a seismic detector constructed as shown in Fig. 1 may weigh from 3–6 pounds, a detector of equal sensitivity constructed as shown in Fig. 2 can be made to weigh as little as 2 pounds or even less.

Obviously, many other modifications and variations of the invention, as hereinbefore set forth, may be made without departing from the spirit and scope thereof, but only such limitations should be imposed as are indicated in the appended claims.

I claim:

1. In a vibration detector, a rod-like magnet having a pole at each end, a soft iron plate connected to and extending radially from one pole of said magnet, a soft iron cylinder extending from the periphery of said plate and encircling said magnet, a soft iron pole piece extending laterally inward from the outer edge of said cylinder toward said magnet so as to provide an air gap therebetween, said magnet, plate, cylinder and pole piece constituting a substantially closed magnetic circuit, an inertia inductor member of metallic, non-magnetic material resiliently suspended within said air gap, a pick-up coil disposed in close proximity to said magnet for producing an electrical current upon relative movement between said inductor member and said magnet, means for magnetically shielding said coil from external magnetic fields comprising a soft iron member surrounding and spaced radially from said first cylinder and a layer of non-magnetic metal disposed between and in contact with said magnetic circuit and said magnetically shielding means.

2. In a vibration detector, a rod-like magnet having a pole at each end, a soft iron plate rigidly connected to and extending radially outward from one pole of said magnet, a soft iron pole piece in contact with and extending axially from the other pole of said magnet, a soft iron hollow cylinder extending from the periphery of said plate and encircling said magnet and said pole piece, a second soft iron pole piece extending laterally inward from the other end of said cylinder toward said first pole piece so as to provide an air gap between said pole pieces, said plate, cylinder and pole pieces constituting a substantially closed magnetic circuit, an inertia member of metallic, non-magnetic material resiliently suspended from said second pole piece within said air gap, a pick-up coil surrounding a portion of said first pole piece and located intermediate said plate and said air gap, said coil being in the path of said magnetic circuit and responsive to variations in flux produced in said magnetic circuit by relative movement between said inertia member and said pole pieces, an insulating member fixed to and mounted directly above said plate, coil posts fixed to said member, and means electrically connecting said posts and said binding, means for magnetically shielding said winding from external magnetic fields comprising a second soft iron cylinder surrounding and spaced radially from said first cylinder and a layer of non-magnetic metal disposed between and in contact with said magnetic circuit and said magnetically shielding means.

3. A vibration detector as described in claim 2 in which a second soft iron plate closes the end of the shield cylinder nearest said air gap, and a soft iron cover member closes the other end of said shield cylinder.

4. A vibration detector as described in claim 3 in which the shield cylinder, the second plate and the cover member comprises the housing for the detector.

5. A vibration detector as described in claim 2 in which said layer of non-magnetic metal includes a cylinder disposed between the two soft iron cylinders to provide an electrostatic shield for the coil winding, said cylinder of non-magnetic material extending from said soft iron plate to said second soft iron pole piece.

6. In a vibration detector, a rod-like magnet having a pole at each end, a soft iron plate rigidly connected to and extending radially outward from one pole of said magnet, a soft iron hollow cylinder in contact with and extending from the periphery of said plate and encircling said magnet, a soft iron pole piece fixed to the other end of said cylinder and extending laterally inward from the outer edge of said cylinder toward said magnet so as to provide an air gap therebetween, said magnet, plate, cylinder and pole piece constituting a substantially closed magnetic circuit, an inertia inductor member of metallic, non-magnetic material resiliently suspended within said air gap, a pick-up coil surrounding a portion of said inductor member within said air gap, means for magnetically shielding said coil from external magnetic fields comprising a soft iron cup-shaped member and a soft iron cover member surrounding said magnetic circuit and a layer of non-magnetic metal disposed between and in contact with said magnetic circuit and said magnetically shielding means.

7. A vibration detector as described in claim 6 in which said inertia inductor member is in the form of a continuous ring of copper having an outer circumferential groove and the pick-up coil is disposed around said ring and within said groove.

8. A vibration detector as described in claim 6 in which said layer of non-magnetic metal is in the form of a copper cup and a brass cover.

9. A vibration detector comprising a magnetic circuit having an air gap and a non-magnetic conductive inertia member resiliently supported within said air gap, a pick-up coil magnetically coupled to said magnetic circuit, a magnetic shielding member formed of low reluctance material substantially enclosing the magnetic circuit and means for substantially magnetically insulating said magnetic circuit from said magnetic shielding member comprising a non-magnetic conductive member interposed between and in contact with said magnetic circuit and said shielding member.

10. A vibration detector comprising a magnetic circuit having an air gap and a non-magnetic metallic inertia member resiliently supported within said air gap, a pick-up coil disposed within the magnetic field of said magnetic circuit, a soft iron member substantially enclosing said magnetic circuit and a copper member for substantially magnetically insulating the magnetic circuit from the soft iron member interposed between and in contact with said magnetic circuit and said soft iron member.

References Cited in the file of this patent

UNITED STATES PATENTS

| 1,688,622 | Johnson | Oct. 23, 1928 |
| 1,693,072 | De Forest | Nov. 28, 1928 |
| 2,130,213 | Wolf | Sept. 13, 1938 |
| 2,271,864 | Honnell | Feb. 3, 1942 |
| 2,651,769 | Stafford | Sept. 8, 1953 |